United States Patent [19]

Dormehl

[11] 4,218,816
[45] Aug. 26, 1980

[54] MACHINE TOOLS

[75] Inventor: Erich Dormehl, Giessen, Fed. Rep. of Germany

[73] Assignee: Heyligenstaedt & Comp. Werkzeugmaschinenfabrik GmbH, Giessen, Fed. Rep. of Germany

[21] Appl. No.: 923,237

[22] Filed: Jul. 10, 1978

[30] Foreign Application Priority Data

Aug. 18, 1977 [DE] Fed. Rep. of Germany ....... 2737225

[51] Int. Cl.³ ........................................... B23Q 3/155
[52] U.S. Cl. .................................... 29/568; 82/36 A; 414/730
[58] Field of Search ..................... 29/568, 26 A, 27 C; 82/36 A; 414/730

[56] References Cited

U.S. PATENT DOCUMENTS

| 3,300,856 | 1/1967 | Daugherty | 29/568 |
| 4,087,901 | 5/1978 | Lohneis et al. | 29/568 |

FOREIGN PATENT DOCUMENTS

| 1477429 | 1/1970 | Fed. Rep. of Germany | 29/568 |
| 2031219 | 1/1971 | Fed. Rep. of Germany | 29/568 |
| 2656608 | 6/1977 | Fed. Rep. of Germany | 82/36 A |

*Primary Examiner*—Z. R. Bilinsky
*Attorney, Agent, or Firm*—Schwartz & Weinrieb

[57] ABSTRACT

A machine tool comprising a turret for receiving tools, a drum magazine for storing further tools, and an automatic device for conveying the tools from the magazine into a working position on the turret, in which the drum magazine is arranged coaxially to the turret. The tools of the turret may define a pitch circle and the drum magazine may be constructed as part of the turret within the pitch circle or it may be arranged in rotary manner within the said pitch circle. In another construction, the drum magazine has the shape of a circular segment and is arranged outside the turret.

12 Claims, 3 Drawing Figures

MACHINE TOOLS

BACKGROUND OF THE INVENTION

This invention relates to a machine tool with a turret for receiving tools, with a drum magazine for storing further tools and with an automatic device for conveying the tools from the magazine into a working position on the turret.

Machine tools of this type are generally known. As an example of the prior art, reference is made to German Offenlegungsschrift No. 1,477,429 which discloses a milling machine in which the magazine is arranged above the drum turret. Therefore, a relatively complicated and costly mechanism is required for conveying tools from the magazine to the drum turret in the working position. In addition, considerable time is required for transporting a tool from the magazine to the turret, during which time the machine tool must be stationary, thereby increasing the idle times of the latter. In the construction known from the above publication there is no danger of a collision between unused tools and the workpiece or with the clamping mechanism, because in the drum magazine the tools are stored at a right angle to the axis of the tools in the drum turret.

In order to reduce idle times and simplify constructional expenditure compared with constructions having intermediate magazines, lathes have been constructed with two turrets of different diameters positioned coaxially with respect to one another. German Offenlegungsschrift No. 2,656,608 shows such a construction, wherein the inner turret carries the tools for machining external diameters, whilst the outer turret carries tools for machining the internal diameters. To make it possible to use the tools of the inner turret, a sector is cut out of the outer turret, but the freedom from collisions is not satisfactory because, when machining external diameters, there is a danger that tools for machining the internal diameters will radially collide with the chuck of the work spindle or the workpiece to be machined. The smaller the sector in the outer turret which is not occupied by tools, the greater said risk. However, if for avoiding collision problems said sector is made as large as possible, the number of tools which can be arranged on the outer turret is reduced, which is economically undesirable. In addition, the tools on the outer turret must have such a reciprocal spacing that they do not mutually impede one another during the machining of internal diameters. When machining internal diameters, there is a risk of the tools for machining the external diameters axially colliding with the chuck of the work spindle or with the workpiece to be machined. To reduce this risk, the two turrets disclosed in German Offenlegungsschrift No. 2,656,608 are at an angle to one another but this significantly increases the cost of turret construction.

SUMMARY OF THE INVENTION

The object of the invention is to provide a machine tool of the type indicated above which permits with maximum speed a change between a maximum number of tools, in which the turret and drum magazine require little space and which is of simple construction.

Accordingly, the present invention provides a machine tool comprising a turret for receiving tools, a drum magazine for storing further tools, and an automatic device for conveying the tools from the magazine into a working position on the turret, wherein the drum magazine is arranged coaxially to the turret.

The main advantages of the invention are that the tools only have to be moved in the substantially radial direction out of the drum magazine in order to pass into the turret in the working position. Thus, it is possible to change the tools without a costly tool changer. In addition, little time is required for changing the tools, so that only short idle times are required in the machine tool for the purpose of changing tools.

If, in accordance with one embodiment of the invention, the drum magazine is constructed as part of the turret within the pitch circle of the tools of said turret it is merely necessary for the tools to be moved radially outwards onto the turret to pass into the working position. As the magazine has a considerable radial spacing from the tools on the turret in the working position, there is still only a limited danger of collision if for example very long drill rods are stored in the magazine.

A disadvantage of this embodiment of the invention is that it is always necessary to provide free spaces for the tools from the drum magazine between the tools arranged on the turret, which reduces the maximum possible number of tools. This can be obviated according to further advantageous embodiment of the invention if the drum magazine is arranged in a rotary manner within the pitch circle of the tools of the turret. As a result, between the tools of the drum turret it is merely necessary to provide a single free space for a tool from which a guide passes to the drum magazine.

According to an alternative embodiment of the invention, the drum magazine is in the form of a circular segment and is arranged outside the turret.

This latter embodiment has the particular advantage that the tools can be stored in directly juxtaposed manner in the drum magazine, whereas on the outer turret of the turret head according to the above-mentioned German Offenlegungsschrift No. 2,656,608 there must be such a mutual spacing that when working with one tool the adjacent tools do not collide with the workpiece or with the clamping mechanism.

Advantageously, the drum magazine is rotatable, so that a tool change is possible during the time when the machine is working.

Preferably, a lifting device is provided in the turret for transporting the tools from and to the drum magazine. With this arrangement, it is possible with a single lifting device which need only be suitable for performing a translatory movement to reach any tool in the drum magazine and transport it to the turret. It is advantageous if the lifting device is simultaneously the clamping mechanism for the tool in the turret.

BRIEF DESCRIPTION OF THE DRAWINGS

The invention will now be further described, by way of example, with reference to the drawings, in which.

In the drawings, like parts are denoted by like reference numerals.

DESCRIPTION OF PREFERRED EMBODIMENTS

Figure 1:
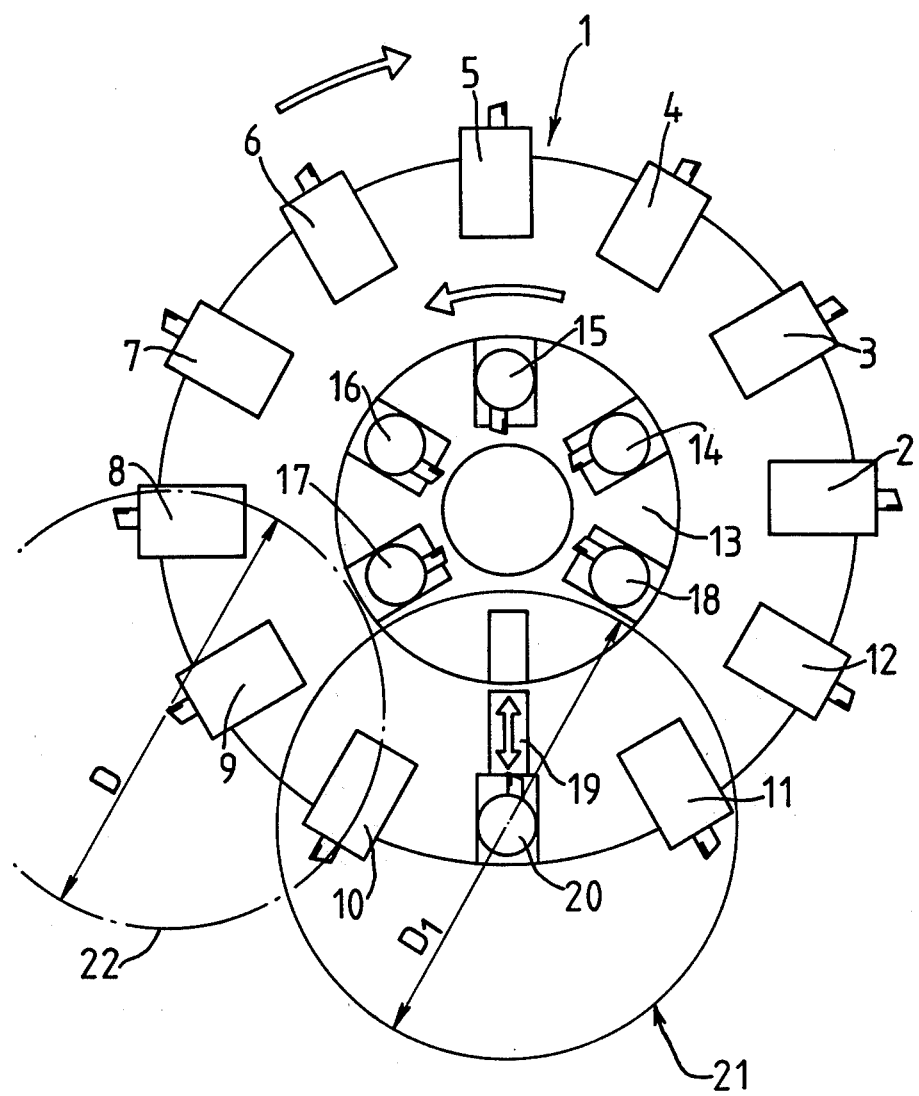
FIG. 1 is a front view of one embodiment of a machine tool according to the invention having a turret with an integrated drum magazine.

Reference will first be made to FIG. 1 of the drawings in which tools 2-12 for machining external diameters of workpieces are arranged on a turret 1. A drum magazine 13, which can be rotated independently of the turret by means of a drive (not shown), is located coaxially in the turret 1. The drum magazine 13 contains tools 14, 15, 16, 17 and 18 for machining the internal diameters of workpieces, whereby in the case of a corresponding construction of the turret said tools can be rotary tools.

Between the tools 10 and 11 of the turret 1, a guide 19 is provided by means of which it is possible to transport tools from the drum magazine 13 to the turret 1 in a working position. It is clear from the drawing that a tool 20 has been taken from the drum magazine 13 and has been brought into the working position on the turret. A simple lifting device for achieving said conveying movement is not shown.

To show the degree of freedom from collisions with the arrangement according to the invention, two circles 21 and 22 are shown in FIG. 1 and these indicate both for the machining of internal and external diameters how large the maximum diameters of the workpieces can be without there being any risk of collision with the tools for the machining of internal diameters in drum magazine 13.

The described arrangement functions in the following manner. If the tools 2-12 are used for machining external diameters, all the tools 14, 15, 16, 17, 18 and 20 for machining the internal diameters are located in drum magazine 13. If a tool is to be used for machining internal diameters, drum magazine 13 is rotated until the desired tool 14 to 18 or 20 is in alignment with the guide 19. This tool is then transported by a transporting mechanism (not shown) to a working position in the turret 1 and is fixed in place. If this tool is to be replaced by another tool for machining internal diameters, it is initially transported back into its original position in the drum magazine 13, after which the latter is rotated so that the other desired tool is in alignment with the guide 19 and can be moved to the same way in the working position in the turret 1.

Figure 2:
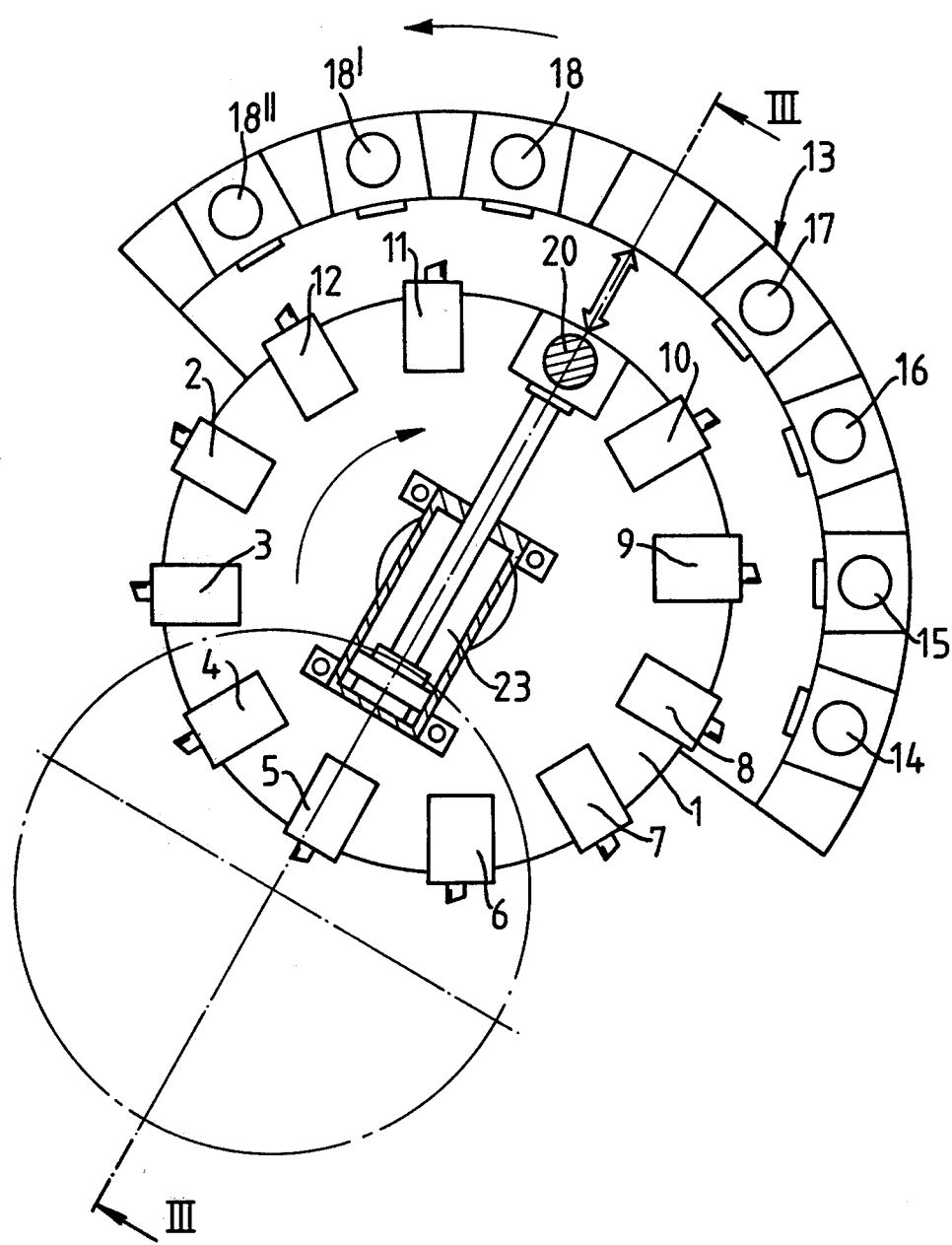
FIG. 2 is a front view of a second embodiment of a machine tool according to the invention having a drum turret with a peripherally arranged drum magazine.
Figure 3:
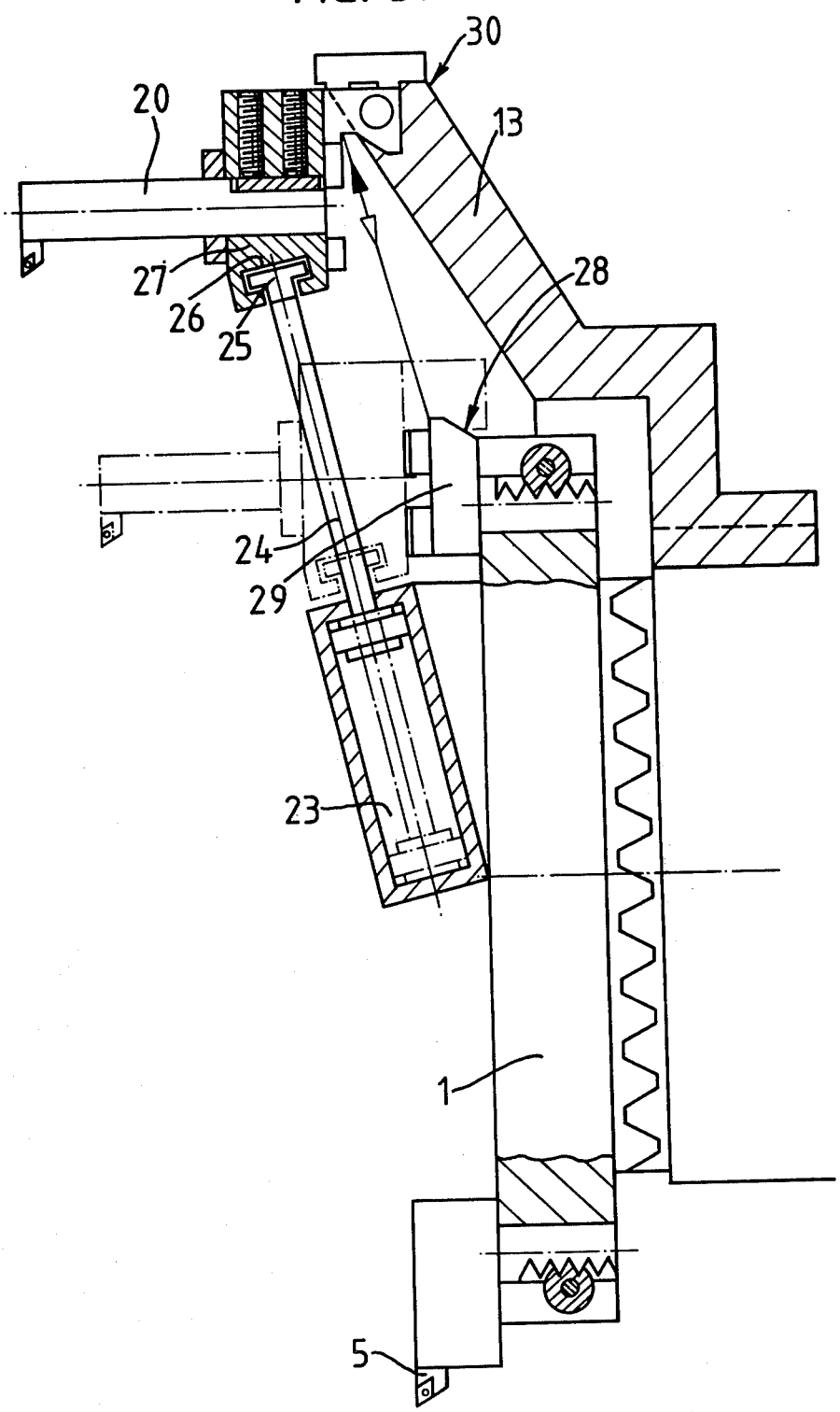
FIG. 3 is a section taken along the line III—III in FIG. 2 in the direction of the arrows.

The embodiment shown in FIGS. 2 and 3 differs from that shown in FIG. 1 in that the drum magazine 13 is not arranged coaxially in the turret 1, but is instead positioned coaxially outside the turret 1. As in the embodiment shown in FIG. 1, tools 14, 15, 16, 17, 18, 18' and 18" for machining internal diameters are stored in the drum magazine 13. A tool 20 is located in the position of readiness in the turret 1. In a conventional manner, the turret also contains tools 2-12 for machining external diameters. Once again between tools 10 and 11 a portion is cut out and in it is held tool 20 for machining internal diameters. Transportation of tools 14-18, 18', 18" and 20 from drum magazine 13 to turret 1 is carried out by a lifting mechanism 23 comprising a piston and a cylinder and which is preferably constructed in such a way that it not only transports the tools to the turret 1, but also secures them there.

The drum magazine 13 is in the shape of a circular segment so that, on machining both internal and external diameters, there is adequate freedom from collision.

As shown in FIG. 3, the lifting mechanism 23 comprises a cylinder having a piston rod 24 extending from it, the end of said piston rod remote from the cylinder being provided with a T-shaped coupling member 25 which is engageable, by lateral swinging of the drum magazine 13, in a guide groove 26 of a tool holder 27. This tool holder is normally mounted on a mounting support 30 as shown in full lines in FIG. 3. A support member 29, provided with guides 28, is fixed in a receiving bore in the turret 1, said bore extending perpendicular to the axis of the turret 1, and said guides 28 are arranged to engage the tool holder 27 when said tool holder is moved to the position shown in chain-dotted lines in FIG. 3 under the action of the cylinder which acts on the piston rod 24 which in turn acts on the tool holder 27 by means of the engagement of the T-shaped coupling member 25 on the end of the rod 24 in the groove 26 in the tool holder 27.

Since the lifting device is inclined relative to the plane of the turret 1, the tool holder 27 is forced axially from below against the turret 1 by the lifting device 23. The tool holder 27 is also held firmly against the turret 1 by the guides 28.

The drum magazine 13 can be stationary, so that the turret 1 can be pivoted into the desired position. However, it is also possible for the drum magazine 13 to be rotatable, so that a tool change can take place when working with the machine tool.

The invention is not restricted to the above described embodiments but modifications and variations may be made without departing from the spirit and scope thereof.

I claim:

1. A machine tool, comprising:
   means for mounting a workpiece along a first axis;
   a first set of tools;
   a rotatably indexable turret including means for clamping said first set of tools each clamped tool being selectively engageable with said workpiece so as to machine said workpiece in a predetermined manner;
   a second set of tools;
   a drum magazine for storing said second set of tools;
   said turret and said drum magazine being coaxially disposed with respect to each other along a second axis parallel to said first workpiece axis; and
   means for selectively conveying particular tools of said first and second sets of tools in one continuous rectalinear movement along a substantially radial direction with respect to said second axis directly between said turret and said drum magazine.

2. A machine tool as claimed in claim 1, in which the tools of said turret define a pitch circle and in which said drum magazine is constructed as part of the turret within said pitch circle.

3. A machine tool as claimed in claim 1, in which:
   the tools of said turret define a pitch circle; and
   said drum magazine is rotatably indexable within the pitch circle of said tools.

4. A machine tool as claimed in claim 1, in which:
   the drum magazine has the shape of a circular segment and is disposed radially exteriorly of, and circumferentially about, the turret.

5. A machine tool as claimed in claim 4, in which:
   the drum magazine is rotatably indexable.

6. A machine tool as claimed in claim 4, in which:
   said means for selectively conveying comprises a lifting device for conveying the tools from and to the drum magazine disposed radially inwardly of the turret.

7. A machine tool as claimed in claim 6, in which:

said lifting device includes means for transporting and clamping the tools.

8. A machine tool as claimed in claim 7, in which a support member is arranged in a receiving bore of the turret and is arranged to receive tools transported thereto by said lifting device.

9. A machine tool as claimed in claim 7, which said turret has a plurality of tool holders, in which each said tool holder has a guide groove, and in which said lifting device has a coupling member engageable in the guide grooves of said tool holders.

10. A machine tool as claimed in claim 6, in which said drum magazine is arranged in a plane in front of the turret and the lifting device is correspondingly inclined towards the turret.

11. A machine tool as set forth in claim 1, wherein:
    said turret and said drum magazine are disposed in a substantially co-planar manner with respect to each other.

12. A machine tool as set forth in claim 6, wherein:
    said lifting device is a piston and cylinder mechanism.

* * * * *